US009736176B2

(12) United States Patent
Machado et al.

(10) Patent No.: US 9,736,176 B2
(45) Date of Patent: *Aug. 15, 2017

(54) SYSTEM AND METHOD FOR DETECTING SECURITY EXPOSURES OF VOIP DEVICES

(71) Applicant: RingCentral, Inc., Belmont, CA (US)

(72) Inventors: Michael Machado, Santa Clara, CA (US); James Savory, Fremont, CA (US); Andrey Bogdanov, Arkhangelsk (RU)

(73) Assignee: RingCentral, Inc., Belmont, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 14/789,844

(22) Filed: Jul. 1, 2015

(65) Prior Publication Data

US 2015/0304352 A1 Oct. 22, 2015

Related U.S. Application Data

(63) Continuation of application No. 14/231,667, filed on Mar. 31, 2014, now Pat. No. 9,104,879.

(51) Int. Cl.
*H04L 29/06* (2006.01)
*G06F 21/57* (2013.01)
*H04L 12/66* (2006.01)
*H04L 12/54* (2013.01)
*H04M 3/42* (2006.01)

(52) U.S. Cl.
CPC ........ *H04L 63/1433* (2013.01); *G06F 21/577* (2013.01); *H04L 12/66* (2013.01); *H04L 63/1408* (2013.01); *H04L 65/1059* (2013.01); *H04L 65/1069* (2013.01); *H04L 12/56* (2013.01); *H04M 3/42* (2013.01); *H04Q 7/20* (2013.01)

(58) Field of Classification Search
USPC ........................................................ 726/22
See application file for complete search history.

(56) References Cited

U.S. PATENT DOCUMENTS

| | | |
|---|---|---|
| 2006/0256778 A1 | 11/2006 | Nakamura |
| 2007/0177615 A1 | 8/2007 | Miliefsky |
| 2014/0079202 A1 | 3/2014 | Movshovich et al. |

OTHER PUBLICATIONS

Leone et al., "VoIP Security Testing and Solutions," Hakin9, May 2007, 7 pages.
Persky, "VoIP Security Vulnerabilities," SANS Institute, 2007, 127 pages.

*Primary Examiner* — Anthony Brown
*Assistant Examiner* — Samuel Ambaye
(74) *Attorney, Agent, or Firm* — Fish & Richardson P.C.

(57) ABSTRACT

Methods, systems, and apparatus, including computer programs encoded on a computer storage medium, for detecting security exposures of Voice over Internet Protocol (VOIP) devices. One of the methods includes obtaining data identifying a source Internet Protocol (IP) address associated with a communication device that has been provisioned with configuration files for VOIP services; determining that a VOIP phone configuration interface is exposed over an untrusted network at the source IP address; and determining that the communication device associated with the source IP address has a security exposure based at least in part on determining that the VOIP phone configuration interface is exposed over the untrusted network at the source IP address.

20 Claims, 3 Drawing Sheets

SYSTEM AND METHOD FOR DETECTING SECURITY EXPOSURES OF VOIP DEVICES

CROSS-REFERENCE TO RELATED APPLICATION

This is a continuation application of U.S. application Ser. No. 14/231,667, filed Mar. 31, 2014, the disclosure of which is hereby incorporated by reference in its entirety.

BACKGROUND

This disclosure relates to detecting security exposures of Voice over Internet Protocol (VoIP) devices.

Some VOIP devices, e.g., VOIP hard phones, can be configured by remotely accessing a configuration interface for the VOIP device using a device different from the VOIP device, often over a network. While the VOIP phone configuration interface may be password-protected, in some cases, passwords may be easily guessable or remain set to a default password. In other cases, a VOIP phone's configuration interface may not have a password implemented.

SUMMARY

In general, one innovative aspect of the subject matter described in this disclosure can be embodied in methods that include the actions of obtaining data identifying a source Internet Protocol (IP) address associated with a communication device that has been provisioned with configuration files for Voice Over IP (VOIP) services; determining that a VOIP phone configuration interface is exposed over an untrusted network at the source IP address; and determining that the communication device associated with the source IP address has a security exposure based at least in part on determining that the VOIP phone configuration interface is exposed over the untrusted network at the source IP address.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can optionally include one or more of the following features. In some aspects, the untrusted network is the Internet. In some aspects, obtaining data identifying the source IP address comprises: obtaining the data from a log of successful provisioning requests. Some aspects further include identifying a subscriber account associated with the source IP address; and marking the subscriber account for follow-up based on determining that the device associated with the source IP address has a security exposure. In some aspects, determining that a VOIP phone configuration interface is exposed over an untrusted network at the source IP address comprises: submitting a Hypertext Transfer Protocol (HTTP) request to the source IP address over the untrusted network; and determining that a user interface is provided in response to the HTTP request.

In some aspects, determining that a VOIP phone configuration interface is exposed over an untrusted network at the source IP address further comprises: determining that the user interface is a VOIP phone configuration interface. In some aspects, determining that the user interface is a VOIP phone configuration interface comprises: identifying one or more heuristics associated with VOIP phone configuration interfaces; comparing the user interface to the one or more heuristics; and determining that the user interface satisfies the one or more heuristics. In some aspects, the one or more heuristics include a presence of more than a threshold number of keywords indicative of a VOIP phone configuration interface. In some aspects, the keywords are specific to a type of the communication device.

The details of one or more embodiments of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present disclosure generally describes detecting security exposures of voice over Internet Protocol (VOIP) devices, i.e., communication devices that have been provisioned with VOIP services. In particular, the present disclosure describes techniques for detecting security exposure of VOIP devices that are associated with a VOIP phone configuration interface, e.g., a user interface that is accessible from a device other than the VOIP phone, often over a network, and that is used to configure various aspects of the operation of the VOIP device.

Particular embodiments of the subject matter described in this disclosure can be implemented so as to realize one or more of the following advantages. VOIP devices that have security exposures by virtue of having a VOIP phone interface, e.g., a configuration interface, exposed over an untrusted network can be easily identified. Users of a VOIP service provider system that are using devices that have security exposures can automatically be flagged and can then be made aware of the vulnerability of their devices to remote attackers.

Figure 1:
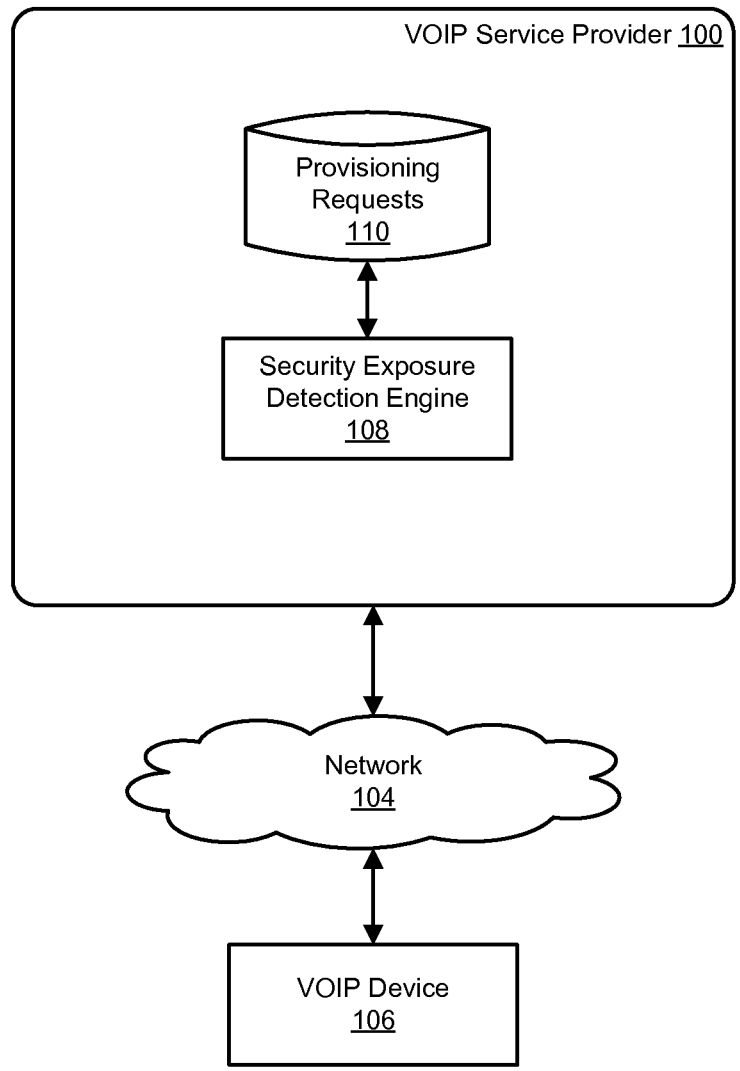
FIG. 1 shows an example VOIP service provider system.

FIG. 1 shows an example VOIP service provider system 100. The VOIP service provider system 100 is an example of a system implemented as computer programs on one or more computers in one or more locations, in which the systems, components, and techniques described below can be implemented.

The VOIP service provider system 100 provides VOIP services, i.e., VOIP telephony services, to subscribers of the system. For example, the VOIP service provider system 100 may be a hosted private branch exchange (PBX) system that provides PBX services that include VOIP telephony services to subscribers of the system.

When a subscriber of the system wants to use a new telecommunications device, e.g., the VOIP device 106, with the VOIP service provider system 100, the subscriber registers the device with VOIP service provider system 100, e.g., by submitting a provisioning request to the VOIP service provider system 100 over a network 104, and the VOIP service provider system 100 provisions the VOIP device 106 with configuration files and VOIP services over the network 104. The network 104 can include, for example, a local area network (LAN), a cellular phone network, a wide area network (WAN), e.g., the Internet, or a combination of them.

Once the VOIP device 106 has been successfully provisioned, the service provider system 100 stores a log of the successful provisioning request in a provisioning requests data store 110. The provisioning requests data store 110 stores data relating to each successful provisioning request processed by the system 100. The data includes source Internet Protocol (IP) addresses used by the system to provision each communication device with configuration files and VOIP services.

The VOIP service provider system 100 can provision any of a variety of communications devices with VOIP services. For example, the VOIP device 106 may be a personal computer, a mobile telephone, a tablet computer, a VOIP hard phone, or any device capable of sending and receiving data over a packet-switched network. Some VOIP devices, for example, VOIP hard (desktop) phones, are configurable by accessing a VOIP phone configuration interface over a network. That is, users can configure the operation of the VOIP device by, for example, configuring call forwarding settings, configuring do not disturb settings for the VOIP device, configuring dialing shortcuts on the VOIP device, and so on. Although the VOIP phone configuration interface may be password-protected, having the interface available to untrusted users can be a security risk. In particular, if an untrusted user acting maliciously gains access to the phone configuration interface, the untrusted user can, for example, hijack the VOIP device, obtain the necessary configuration information to impersonate the device, or view information on the device that is not intended to be made available to untrusted users.

Thus, in order to determine whether VOIP devices suffer from such security exposure, a security exposure detection engine 108 in the VOIP service provider system 100 analyzes the data in the provisioning requests data store 110 to identify source IP addresses associated with communications devices that have been successfully provisioned with VOIP services. In order to determine whether the devices have the security exposure, the system uses the device's source IP address to determine whether a VOIP phone configuration interface is exposed over an untrusted network, as described below with FIGS. 2 and 3. An untrusted network, e.g., the Internet, is a network that is outside the security perimeter of a given subscriber's organization. As described below, a VOIP phone configuration interface is considered to be exposed over the untrusted network if the VOIP phone configuration interface is provided as a response to a request to access the interface over the untrusted network without the requesting party having any additional security privileges or being present on the VOIP phone's trusted networks.

If the security exposure detection engine 108 determines that a particular VOIP device 106 has a security exposure, the VOIP service provider system 100 can identify the subscriber account associated with the device and mark the account for follow-up, e.g., add the account to a queue of accounts that are to be called by a customer service representative to inform the corresponding subscriber of the potential security issue. In some embodiments, the system 100 also determines whether the VOIP interface is password-protected and, if it is, whether the password is a default password, i.e., whether the password is set to a value that is known to the system 100 to be a default password value for VOIP configuration interfaces. In some embodiments, when the system 100 determines that a particular VOIP device 106 has a security exposure, the system 100 can trigger an update to the configuration data for the VOIP device 106, i.e., configuration data stored by the system 100 for the VOIP device 106. If the system 100 determined that the VOIP interface was not password-protected, the updated configuration data can add a password for the interface. If the system 100 determined that the VOIP interface had a default password, the updated configuration data can change the password to a system-generated temporary password that is stronger than the default password.

In some embodiments, when the system 100 determines that a particular VOIP device 106 has a security exposure, the system 100 can prompt the VOIP device 106 to display a message that indicates that the security exposure has been found.

Figure 2:
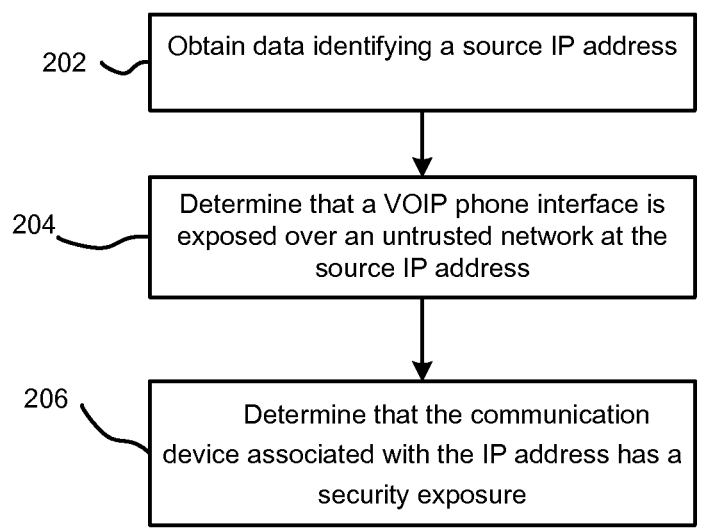
FIG. 2 is a flow diagram of an example process for determining that a VOIP device has a security exposure.

FIG. 2 is a flow diagram of an example process 200 for determining that a VOIP device has a security exposure. The process 200 can be performed by a system of one or more computers. For example, a VOIP service provider system, e.g., the VOIP service provider system 102 of FIG. 1, can perform the process 200.

At step 202, data identifying a source IP address is obtained. The source IP address is an IP address that is associated with a VOIP device, e.g., the VOIP device 106 of FIG. 1, that has been provisioned with configuration files or VOIP services. For example, a log of provisioning requests, e.g., the provisioning request data store 110 of FIG. 1, can be analyzed to determine which provisioning requests, i.e., requests to provision a VOIP device with one or more VOIP services, were successful, and, for the successful requests, a source IP address associated with the device that was provisioned with the VOIP services.

At step 204, a determination is made that a VOIP phone configuration interface is exposed over an untrusted network at the source IP address. An example process for determining whether a VOIP phone's configuration interface is exposed over an untrusted network is described below with reference to FIG. 3.

At step 206, based on the VOIP phone's configuration interface being exposed over the untrusted network at the source IP address, a determination is made that the communication device associated with the IP address has a security exposure.

Figure 3:
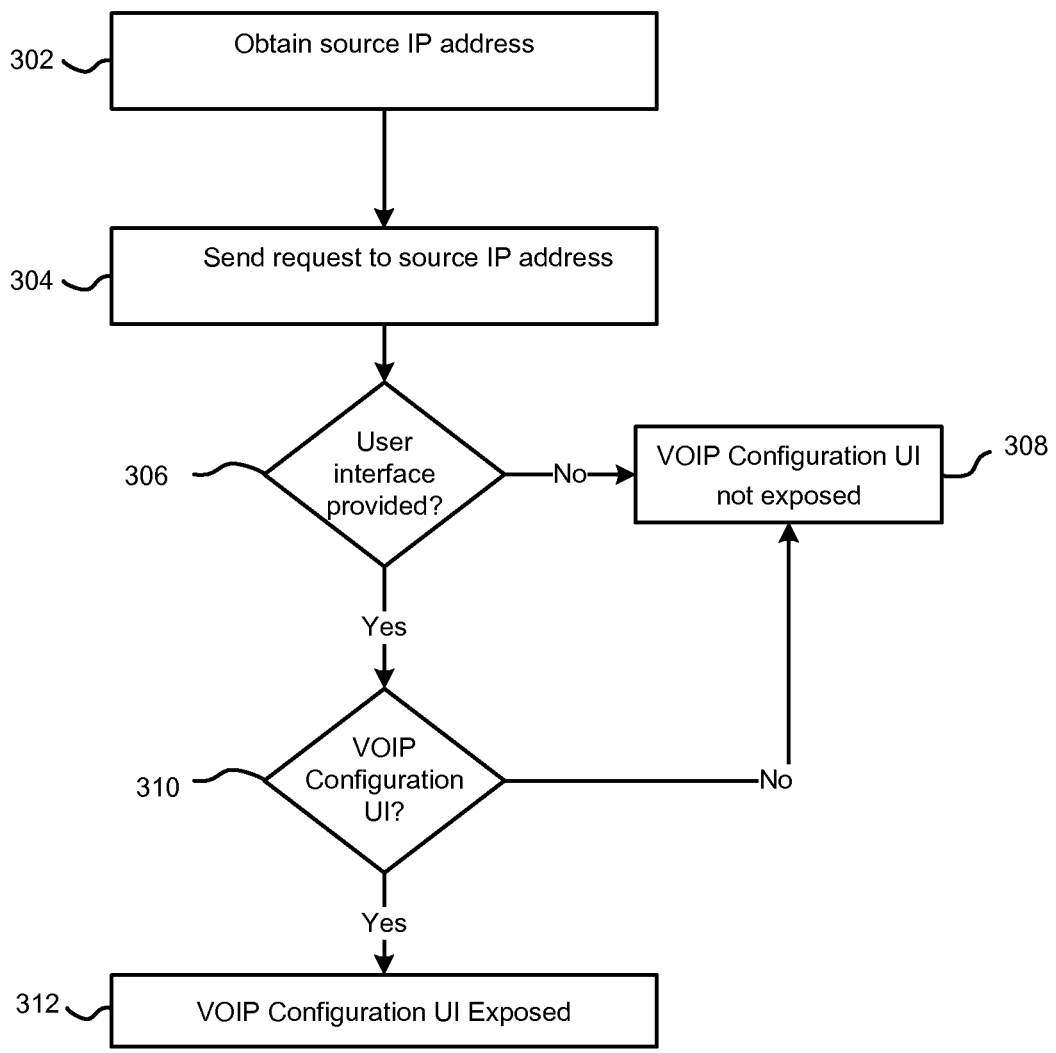
FIG. 3 is a flow diagram of an example process for determining whether a VOIP phone interface is exposed over an untrusted network.

FIG. 3 is a flow diagram of an example process 300 for determining whether a VOIP phone configuration interface is exposed over an untrusted network. The process 300 can be performed by a system of one or more computers. For example, a VOIP service provider system, e.g., the VOIP service provider system 102 of FIG. 1, can perform the process 300.

At step 302 a source IP address is obtained. The source IP address is an IP address that is associated with a VOIP device, e.g., the VOIP device 106 of FIG. 1, that has been provisioned with configuration files or VOIP services.

At step 304, a request is sent to the source IP address over an untrusted network. For example, a Hypertext Transfer Protocol (HTTP) request, e.g., an HTTP GET request, is sent to the source IP address.

At step 306, a determination is made whether a user interface is provided at the source IP address. That is, a determination is made whether a user interface is provided in response to the request.

At step 308, if no user interface is provided at the source IP address, a determination is made that a VOIP user interface is not exposed at the source IP address.

At step 310, if a user interface is provided, a determination is made whether the user interface is a VOIP phone configuration interface. In order to make the determination, heuristics associated with VOIP phone interfaces are compared to characteristics of the provided user interface. If the characteristics of the provided user interface match the heuristics, it is determined that the user interface is a VOIP phone configuration interface. For example, one heuristic can include the presence of more than a threshold number of keywords that have been pre-determined as being associated with VOIP phone configuration interfaces.

In some embodiments, the keywords can include keywords that are specific to certain types of communication devices, e.g., specific to certain communication device manufacturers, or certain communication device models. For example, the keywords for a manufacturer "Example" might include: "Example" or "Example Web Configuration Utility" or "Example IP Phone." In these embodiments, the system can use the returned information about the configuration interface to determine the type of communication device that is associated with the source IP address.

While the above description describes determining whether a VOIP phone configuration interface is exposed over an untrusted network, similar techniques can also be used to determine whether information from other VOIP components is exposed over the untrusted networks. For example, VOIP telephone adaptors that enable users to connect an analog phone to their network and use VOIP services with the analog phone, e.g., analog telephony adaptors (ATAs), may run a HTTP webserver. Techniques similar to those described above can be used to determine whether data from the HTTP webserver run by a VOIP adaptor is exposed over an untrusted network.

Embodiments of the subject matter and the operations described in this disclosure can be implemented in digital electronic circuitry, or in computer software, firmware, or hardware, including the structures disclosed in this disclosure and their structural equivalents, or in combinations of one or more of them. Embodiments of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non-volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this disclosure can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this disclosure contains many specific implementation details, these should not be construed as limitations on the scope of the present disclosure or of what may be claimed, but rather as descriptions of features specific to particular embodiments of the present disclosure. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for determining if a communication device that has been provisioned with configuration files for Voice Over IP (VOIP) services has a security exposure, the method comprising:
   obtaining data identifying a source Internet Protocol (IP) address associated with the communication device;
   submitting a request to the source IP address over an untrusted network;
   determining that a user interface is provided in response to the request submitted to the source IP address over the untrusted network;
   determining that a VOIP phone configuration interface is exposed over the untrusted network at the source IP address based at least in part on determining that the user interface is provided in response to the request submitted to the source IP address over the untrusted network; and
   determining that the communication device associated with the source IP address has a security exposure based at least in part on determining that the VOIP phone configuration interface is exposed over the untrusted network at the source IP address.

2. The method of claim 1, wherein the untrusted network is the Internet.

3. The method of claim 1, further comprising:
   in response to determining that the communication device associated with the source IP address has a security exposure, triggering an update to configuration data for the communication device.

4. The method of claim 3, further comprising:
   determining that the user interface provided in response to the request is not password protected, wherein the update to the configuration data for the communication device adds password protection for the interface.

5. The method of claim 3, further comprising:
   determining that the user interface provided in response to the request is password protected with a default password, wherein the update to the configuration data for the communication device changes the default password to a temporary password that is stronger than the default password.

6. The method of claim 1, wherein determining that a VOIP phone configuration interface is exposed over an untrusted network at the source IP address further comprises:
   determining that the user interface is a VOIP phone configuration interface used to configure operation of the communication device associated with the source IP address.

7. The method of claim 6, wherein determining that the user interface is a VOIP phone configuration interface comprises:
   identifying one or more heuristics associated with VOIP phone configuration interfaces;
   comparing the user interface to the one or more heuristics; and
   determining that the user interface satisfies the one or more heuristics.

8. The method of claim 7, wherein the one or more heuristics include a presence of more than a threshold number of keywords indicative of a VOIP phone configuration interface.

9. The method of claim 8, wherein the keywords are specific to a type of the communication device.

10. A system comprising one or more computers and one or more storage devices storing instructions that when executed by the one or more computers cause the one or more computers to perform operations for determining if a communication device that has been provisioned with configuration files for Voice Over IP (VOIP) services has a security exposure, the operations comprising:
   obtaining data identifying a source Internet Protocol (IP) address associated with the communication device;
   submitting a request to the source IP address over an untrusted network;
   determining that a user interface is provided in response to the request submitted to the source IP address over the untrusted network;
   determining that a VOIP phone configuration interface is exposed over the untrusted network at the source IP address based at least in part on determining that the user interface is provided in response to the request submitted to the source IP address over the untrusted network; and
   determining that the communication device associated with the source IP address has a security exposure based at least in part on determining that the VOIP phone configuration interface is exposed over the untrusted network at the source IP address.

11. The system of claim 10, wherein the untrusted network is the Internet.

12. The system of claim 10, the operations further comprising:
   in response to determining that the communication device associated with the source IP address has a security exposure, triggering an update to configuration data for the communication device.

13. The system of claim 12, the operations further comprising:
   determining that the user interface provided in response to the request is not password protected, wherein the update to the configuration data for the communication device adds password protection for the interface.

14. The system of claim 12, the operations further comprising:
   determining that the user interface provided in response to the request is password protected with a default password, wherein the update to the configuration data for the communication device changes the default password to a temporary password that is stronger than the default password.

15. The system of claim 10, wherein determining that a VOIP phone configuration interface is exposed over an untrusted network at the source IP address further comprises:
   determining that the user interface is a VOIP phone configuration interface used to configure operation of the communication device associated with the source IP address.

16. The system of claim 15, wherein determining that the user interface is a VOIP phone configuration interface comprises:
   identifying one or more heuristics associated with VOIP phone configuration interfaces;
   comparing the user interface to the one or more heuristics; and
   determining that the user interface satisfies the one or more heuristics.

17. The system of claim 16, wherein the one or more heuristics include a presence of more than a threshold number of keywords indicative of a VOIP phone configuration interface.

18. The system of claim 17, wherein the keywords are specific to a type of the communication device.

19. A computer program product encoded on one or more non-transitory computer storage media, the computer program comprising instructions that when executed by one or more computers cause the one or more computers to perform operations for determining if a communication device that has been provisioned with configuration files for Voice Over IP (VOIP) services has a security exposure, the operations comprising:
   obtaining data identifying a source Internet Protocol (IP) address associated with the communication device;
   submitting a request to the source IP address over an untrusted network;
   determining that a user interface is provided in response to the request submitted to the source IP address over the untrusted network;
   determining that a VOIP phone configuration interface is exposed over the untrusted network at the source IP address based at least in part on determining that the user interface is provided in response to the request submitted to the source IP address over the untrusted network; and
   determining that the communication device associated with the source IP address has a security exposure based at least in part on determining that the VOIP phone configuration interface is exposed over the untrusted network at the source IP address.

20. The computer program product of claim 19, wherein determining that a VOIP phone configuration interface is exposed over an untrusted network at the source IP address comprises:
   determining that the user interface is a VOIP phone configuration interface used to configure operation of the communication device associated with the source IP address.

* * * * *